United States Patent
Chen et al.

(10) Patent No.: US 8,286,013 B2
(45) Date of Patent: Oct. 9, 2012

(54) PORTABLE COMMUNICATION DEVICE WITH MULTI-TIERED POWER SAVE OPERATION

(75) Inventors: Chun-ying Chen, Irvine, CA (US); Pieter Vorenkamp, Laguna Niguel, CA (US); Neil Y. Kim, Laguna Niguel, CA (US); Sumant Ranganathan, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1037 days.

(21) Appl. No.: 11/166,304

(22) Filed: Jun. 24, 2005

(65) Prior Publication Data

US 2006/0005058 A1   Jan. 5, 2006

Related U.S. Application Data

(60) Provisional application No. 60/585,188, filed on Jul. 1, 2004.

(51) Int. Cl.
*G06F 1/32*   (2006.01)
(52) U.S. Cl. ........... 713/320; 700/75; 455/574; 320/132
(58) Field of Classification Search .................... 700/75; 713/320; 455/574; 320/132
See application file for complete search history.

(56) References Cited

U.S. PATENT DOCUMENTS

| | | | | |
|---|---|---|---|---|
| 5,799,256 | A | * | 8/1998 | Pombo et al. ................. 455/574 |
| 5,954,820 | A | * | 9/1999 | Hetzler .......................... 713/323 |
| 6,058,289 | A | * | 5/2000 | Gardner et al. .............. 340/7.32 |
| 6,078,819 | A | * | 6/2000 | Ciccone et al. ............... 455/463 |
| 6,119,003 | A | * | 9/2000 | Kukkohovi ................ 455/435.2 |
| 2004/0189244 | A1 | * | 9/2004 | Karapetyan et al. .......... 320/101 |
| 2004/0204175 | A1 | * | 10/2004 | Karaoguz et al. ............. 455/572 |
| 2004/0259542 | A1 | * | 12/2004 | Viitamaki et al. .......... 455/426.2 |

* cited by examiner

*Primary Examiner* — Tejal Gami
(74) *Attorney, Agent, or Firm* — Brinks Hofer Gilson & Lione

(57) ABSTRACT

A system and method for providing multi-tiered power save operation in a portable communication device. A portable communication device may be operated in a first power-save mode. A power-save module of the portable communication device may, for example, provide for operation in such a first power-save mode. It may be determined to operate the portable communication device in a second power-save mode that is different than the first power-save mode. A power-save management module may, for example, make such a determination. The portable communication device may then be operated in the second power-save mode. The power-save module may, for example, provide for operation in such a second power-save mode.

44 Claims, 7 Drawing Sheets

PORTABLE COMMUNICATION DEVICE WITH MULTI-TIERED POWER SAVE OPERATION

CROSS-REFERENCE TO RELATED APPLICATIONS/INCORPORATION BY REFERENCE

This patent application is related to and claims priority from provisional patent application Ser. No. 60/585,188, filed Jul. 1, 2004, and entitled "PORTABLE COMMUNICATION DEVICE WITH MULTI-TIERED POWER SAVE OPERATION," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Users of portable communication systems utilize the systems differently at different points throughout the day, week, etc. For example, a user may utilize a cellular phone very little in the office but a large amount during the two hours immediately after leaving work. The user may also utilize the portable system extremely little in the middle of the night and at moderate levels the hour prior to the workday.

Further, during various points in time throughout a day, a week, or other division of time, the performance requirements on the portable communication system may vary. For example, a user may desire a relatively high level of performance (e.g., when time and/or quality is of the essence) during the workday and another level of performance over a weekend.

System performance level may often be commensurate with power consumption level. For example, operating a portable communication system at a relatively high level of performance may require providing relatively high amounts of power to various electrical devices to support relatively fast processing speed, data rate and response time. Even devices not currently being utilized may receive power during such operation in preparation for their utilization.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for providing multi-tiered power-save operation in a portable communication device, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figures 1, 2:
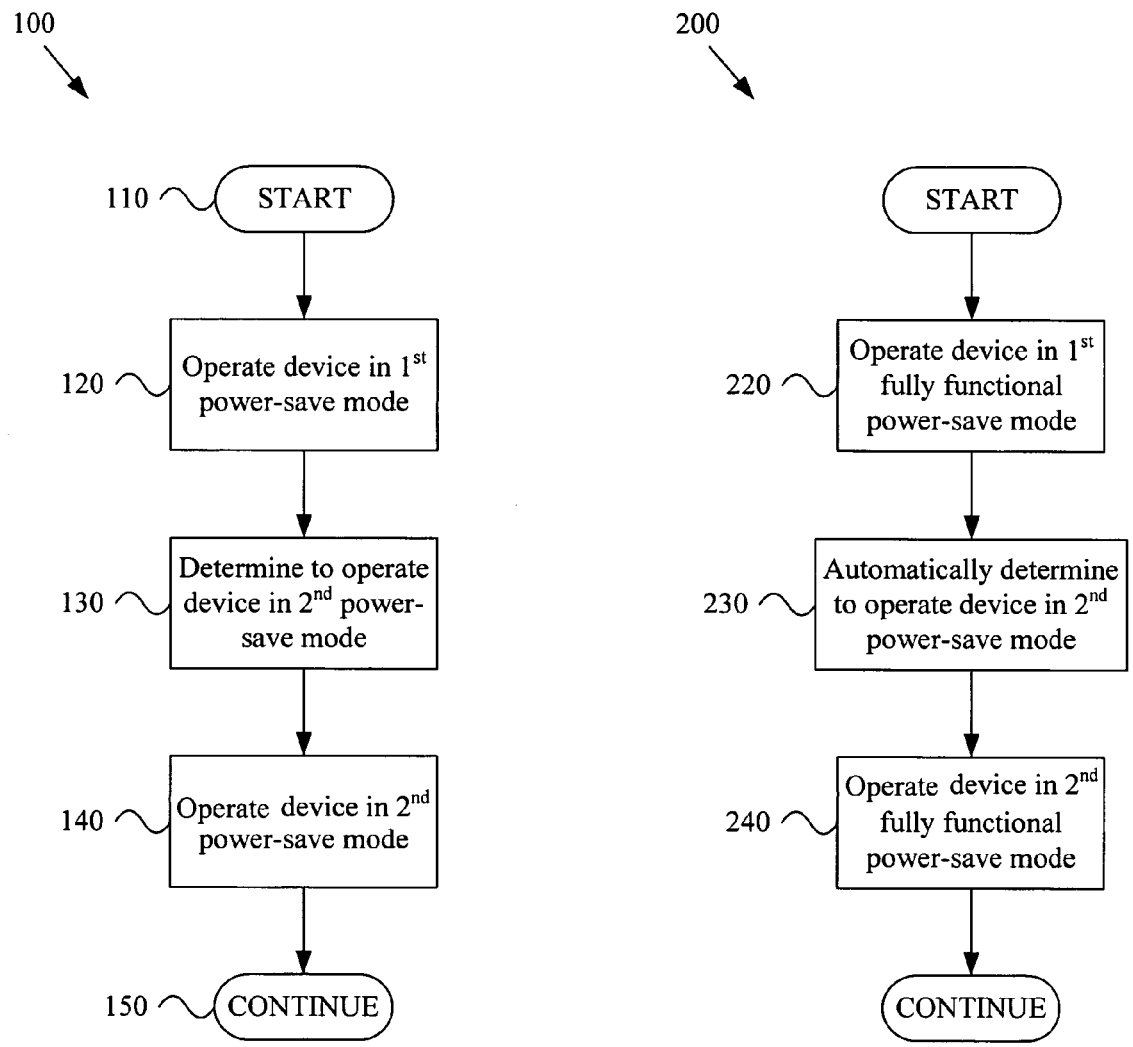
FIG. 1 illustrates an exemplary method for providing multi-tiered power-save operation in a portable communication device, in accordance with various aspects of the present invention.
FIG. 2 illustrates an exemplary method for providing multi-tiered power-save operation in a portable communication device, in accordance with various aspects of the present invention.

FIG. 1 illustrates an exemplary method 100 for providing multi-tiered power-save operation in a portable communication device, in accordance with various aspects of the present invention. A portable communication device may comprise any of a large variety of portable communication devices. For example and without limitation, the portable communication device may comprise a portable phone, pager, personal email device, etc.

The exemplary method 100 may begin at step 110. The method 100 may begin for any of a variety of reasons. For example and without limitation, the method 100 may begin in response to a user request. The method 100 may, for example, begin in response to a detected operating condition. The method 100 may, for example, begin in response to a request generated by circuitry internal to or external to the portable communication device. Also, for example, the method 100 may begin automatically upon powering-up or resetting the portable communication device. Accordingly, the scope of various aspects of the present invention should not be limited by characteristics of any particular initiating event, cause or condition.

The exemplary method 100 may, at step 120, comprise operating the portable communication device in a first power-save mode. Such a first power-save mode may, for example, be characterized by full functionality at a reduced performance level relative to a normal operating mode or may be characterized by reduced functionality. In an exemplary scenario where step 120 comprises operating the portable communication device in a first power-save mode characterized by full functionality, the first power-save mode might, for example, comprise operating the portable communication device without placing any electrical components of the portable communication device in a sleep state. That is, the electrical devices may be operated in a non-sleep state (e.g., responsive to stimuli in real-time) but at a reduced performance level (e.g., lower responsiveness, higher error rate, higher noise rate, slower processing speed, etc.).

The first power-save mode may alternatively, for example, comprise placing a portion (e.g., a first amount) of the electrical components of the portable communication device in a sleep state (e.g., for a first time period). Such a sleep state may, for example, comprise a state where the sleeping device is waiting for a signal (e.g., as generated by a sleep timer, another device or user input) to cause the sleeping device to wake. Such a sleep state may also, for example, comprise a state where the sleeping device is receiving a relatively slow clock signal or a relatively low power level. A device, component or module in a sleep state may generally comprise any of a large variety of known sleep state characteristics.

The first power-save mode may, for example, be characterized by electrical components operating in first respective states. For example and without limitation, the first power-save mode may be characterized by all electrical components in the portable communication device operating normally, albeit with a non-standard power supply or a reduced clock speed. For example, the first power-save mode may be characterized by a first portion of electrical components in a fully operational state and a second portion of electrical components in a sleep state.

The first power-save mode may, for example, comprise a default power-save mode. For example, the portable communication device may operate in the default power-save mode in the absence of a condition or command to cause the portable communication device to enter a different power-save mode.

The first power-save mode may, for example, be characterized by a variety of operating characteristics. For example and without limitation, the first power-save mode may be characterized by a first set of power supply characteristics (e.g., characterizing electrical power provided to at least a portion of portable communication device components). Such power supply characteristics may, for example, comprise voltage level characteristics, current level characteristics, voltage and/or current stability characteristics, noise characteristics, tolerance characteristics, ripple characteristics, etc. The first power-save mode may also, for example, be characterized by clock characteristics, sleep duration or operating temperature characteristics.

In general, step 120 may comprise operating the portable communication device in a first power-save mode. Accordingly, the scope of various aspects of the present invention should not be limited by particular power-save mode characteristics or a particular manner of operating a portable communication device in a power-save mode.

The exemplary method 100 may, at step 130, comprise determining to operate the portable communication device in a second power-save mode that is different than the first power-save mode.

For example and without limitation, step 130 may comprise determining to operate the portable communication device in a second power-save mode based at least in part on a pre-determined operating profile. Such a predetermined operating profile may, for example, comprise information of timeframe, events, or other indications that may trigger a change in power-save mode. Such a predetermined operating profile may, for example, comprise a table of timeframe versus default power-save mode. Such a predetermined operating profile may, for example, comprise a table of events or conditions correlated with a particular power-save mode. The predetermined operating profile may, for example, comprise day, day type (e.g., workday, weekend, holiday, etc.), or date information. In general, the predetermined operating profile may comprise any of a large variety of information correlating various aspects of power-save operation to various events and conditions.

The predetermined operating profile may, for example, comprise information received from a user. For example and without limitation, a user may enter operating profile information through a user interface of the portable communication device, or a user may enter operating profile information on a separate device that may be communicatively coupled, at least temporarily, to the portable communication device.

The predetermined operating profile may, for example, comprise information determined or calculated by a computing device (e.g., a processing module of the portable communication device). Also for example, step 130 may comprise determining operating profile information based on prior monitored usage of the portable communication device.

Step 130 may, for example, comprise determining to operate the portable communication device in a second power-save mode in response to monitored usage characteristics. Such usage characteristics may, for example, comprise an amount of time passing between the present time and a time of previous device usage. Such usage characteristics may, for example, indicate an end to a need for high performance operation of the portable communication device. Such usage characteristics may, for example, indicate a need for higher performance operation, which may, for example, lead to a determination to operate the portable communication device in a power-save mode that exhibits higher performance characteristics than another power-save mode.

Step 130 may, for example, comprise determining a level of remaining power (or energy) for the portable communication device. For example and without limitation, in an exemplary scenario where the portable communication device is running low on power, step 130 may comprise determining to operate the portable communication device in a power-save mode that is more energy-efficient than a current power-save mode. Conversely, for example, a determination of a relatively large amount of energy remaining for device operation may result in a determination to operate the portable communication device in a power-save mode that exhibits higher performance characteristics than a current power-save mode, but at the expense of lower energy efficiency.

Step 130 may, for example, comprise determining to operate the portable communication device in a second power-save mode, different than the first power-save mode, based at least in part on current device operating conditions. For example and without limitation, such operating conditions may comprise operating temperature. Such operation conditions may, for example, comprise communication effectiveness parameters, such as signal power level, noise conditions and/or error rate. In an exemplary scenario, a first power-save mode may provide acceptable device performance in a low noise environment, but an unacceptable level of device performance in a relatively high noise environment (e.g., because of higher power or higher processing speed needs).

Step 130 may, for example, comprise determining to operate the portable communication device in a second power-save mode, different than the first power-save mode, based at least in part on a user request. For example, a user may temporarily desire to operate the portable communication device at a different performance level than that at which the portable communication device is currently operating (e.g., at a relatively medium level of performance during a timeframe at which the portable communication device is usually in a deep sleep mode). Also for example, a user may request that the portable communication device operate at a more or less energy efficient level (e.g., operate at a relatively high level of energy efficiency when the portable communication device is usually or currently operating at a relatively low level of energy efficiency). Step 130 may, for example, comprise responding to a user request by determining to operate the portable communication device in a requested power-save mode (or out of a previously requested power-save mode) for a period of time or until some other specified or default event or condition occurs.

Step 130 may, for example, comprise determining the second power-save mode (or various characteristics thereof) from a finite set of power-save modes (e.g., to 1 of N possible modes). Alternatively, for example, step 130 may comprise determining characteristics of the second power-save mode from a relatively infinite set of characteristics. In an exemplary scenario, one or more characteristics of the second power-save mode may be substantially continuously determinable and/or controllable.

Step 130 may, for example, comprise determining various characteristics of the second power-save mode in real-time (e.g., in response to real-time events and conditions). Step 130 may also, for example, comprise determining such characteristics based at least in part on a desired performance level or a minimum acceptable performance level. Step 130 may further, for example, comprise determining such characteristics based at least in part on a desired energy efficiency level or a minimum acceptable energy efficiency level.

Note that step 130 is not necessarily performed while the portable communication device is being operated in the first power-save mode in accordance with step 120. For example and without limitation, an intervening step may have caused the portable communication device to be operated in a normal mode or some other power-save mode.

In general, step 130, may comprise determining to operate the portable communication device in a second power-save mode that is different than the first power-save mode. Accordingly, the scope of various aspects of the present invention should not be limited by characteristics of a particular manner of making such a determination. Nor should the scope of various aspects of the present invention be limited by particular power-save mode characteristics or a manner of determining such characteristics.

The exemplary method 100 may, at step 140, comprise operating the portable communication device in the second power-save mode. The second power-save mode may, for example, be substantially different than the first power-save mode. The second power-save mode may, for example, share various characteristics with the first power-save mode.

The second power-save mode may, for example, be characterized by full functionality at a reduced performance level and higher energy efficiency relative to the first power-save mode. Conversely, the second power-save mode may, for example, be characterized by full functionality at an increased performance level and reduced energy efficiency relative to the first power-save mode.

Further, for example, the second power-save mode may be characterized by operating the portable communication device without placing any electrical components of the portable communication device in a sleep state. Also, for example, the second power-save mode may be characterized by placing a portion of electrical components in a sleep state. The first and second power-save modes may, for example, be characterized by placing all (or substantially all) of the electrical components of the portable communication device in a similar functional state (e.g., operating normally but with different power supply characteristics or a different clock rate).

In an exemplary scenario, the first power-save mode may be characterized by placing a first portion of electrical components in a sleep state (e.g., for a first time period), and the second power-save mode may be characterized by placing a second portion (different than the first portion) of electrical components in a sleep state (e.g., for a second time period, which may be different than the first time period). In another exemplary scenario, the first power-save mode may be characterized by placing no electrical components in a sleep state, and the second power-save mode may be characterized by placing a portion of electrical components in a sleep state.

The second power-save mode may, for example, be characterized by a set of power supply characteristics. In an exemplary scenario, the first power-save mode may be characterized by a first set of power supply characteristics, and the second power-save mode may be characterized by a second set of power supply characteristics that is different than the first set of power supply characteristics. For example and without limitation, such power supply characteristics may comprise power supply output level (e.g., voltage or current), power supply stability, power supply ripple, power supply tolerance, power supply responsiveness, power supply noise level, etc. The second power-save mode may also, for example, be characterized by a different clock speed, different sleep duration and/or different operating temperature than the first power-save mode.

In general, step 140, may comprise operating the portable communication device in the second power-save mode that is different than the first power-save mode. Accordingly, the scope of various aspects of the present invention should not be limited by characteristics of particular power-save modes or particular ways of operating a portable communication device in a power-save mode.

The exemplary method 100 may, at step 150, perform continued processing (e.g., continued processing related to power-save operation). For example, in an exemplary scenario related to continued power-save processing, step 150 may comprise determining to operate the portable communication device in a third power-save mode that is different than the first and second power-save modes, and operating the portable communication device in the third power-save mode. Also for example, step 150 may comprise performing any of a large variety of processing activities, including but not limited to, signal processing, memory managing, communicating and user interfacing. Accordingly, the scope of various aspects of the present invention should not be limited by characteristics of particular continued processing activities.

FIG. 2 illustrates an exemplary method 200 for providing multi-tiered power-save operation in a portable communication device, in accordance with various aspects of the present invention. The exemplary method 200 may, for example and without limitation, share various characteristics with the exemplary method 100 illustrated in FIG. 1 and discussed previously.

The exemplary method 200 may, at step 220, comprise operating the portable communication device in a first power-save mode that is characterized by full operational functionality. Step 220 may, for example and without limitation, share various characteristics with step 120 of the exemplary method 100 illustrated in FIG. 1 and discussed previously.

For example and without limitation, the first power-save mode may be characterized by full functionality at a reduced performance level relative to a normal operating mode. For example, the first power-save mode may be characterized by operating the portable communication device without placing any electrical components of the portable communication device in a sleep state. For example, the reduced performance level may be characterized by operating various components of the portable communication device in a generally awake state, but operating below a normal performance level. For example and without limitation, such reduced performance level may be characterized by a reduced processing speed, reduced processing accuracy, reduced clock rate, reduced operating temperature, higher noise level, reduced communication rate, relatively low quality signal encoding or decoding, etc.

Step 220 may comprise operating the portable communication device with full functionality and reduced performance in any of a variety of manners. For example and without limitation, step 220 may comprise providing electrical power to various components of the portable communication device, where the electrical power is characterized by a set of power supply characteristics that is different than the normal (or typical) set of power supply characteristics. For example, such power supply characteristics may comprise voltage and/or current level, voltage and/or current stability or variability level, load response characteristics, noise level, etc. Further for example, step 220 may comprise modifying operational speed of various components of the portable communication device. Also for example, step 220 may comprise utilizing hardware and/or software that is different than that utilized during normal operation.

In general, step 220 may comprise operating the portable communication device in a first power-save mode that is characterized by full operational functionality at a reduced performance level. Accordingly, the scope of various aspects of the present invention should not be limited by particular performance characteristics or a particular manner in which the portable communication device may be operated with full functionality at a reduced performance level.

The exemplary method 200 may, at step 230, comprise automatically determining to operate the portable communication device in a second power-save mode that is different than the first power-save mode. Step 230 may, for example and without limitation, share various characteristics with step 130 of the exemplary method 100 illustrated in FIG. 1 and discussed previously.

Step 230 may make such a determination automatically in a variety of manners. For example, step 230 may automatically make such a determination in response to an operating profile. For example, step 230 may, make such a determination in response to real-time operating conditions of the portable communication device. Such conditions may, for example and without limitation, comprise operating environment conditions, power supply conditions, performance demands, use characteristics, signal strength and/or noise level, user command, etc. Step 230 may, for example, comprise monitoring any of a large variety of operational parameters.

In general, step 230 may comprise automatically determining to operate the portable communication device in a second power-save mode that is different than the first power-save mode. Accordingly, the scope of various aspects of the present invention should not be limited by characteristics of any particular manner of making such an automatic determination.

The exemplary method 200 may, at step 240, comprise operating the portable communication device in the second power-save mode. The second power-save mode may, for example and without limitation, be characterized by full functionality and a performance level that is different (e.g., lower) than the performance level associated with the first power-save mode.

As with step 220 discussed previously, step 240 may comprise operating the portable communication device with full functionality and reduced performance in any of a variety of manners. In general, step 240 may comprise operating the portable communication device in a second power-save mode that is characterized by full operational functionality at a reduced performance level, where, for example, the performance level is different than the performance level associated with the first power-save mode. Accordingly, the scope of various aspects of the present invention should not be limited by particular performance characteristics or a particular manner in which the portable communication device may be operated with full functionality at a reduced performance level.

Figure 3:
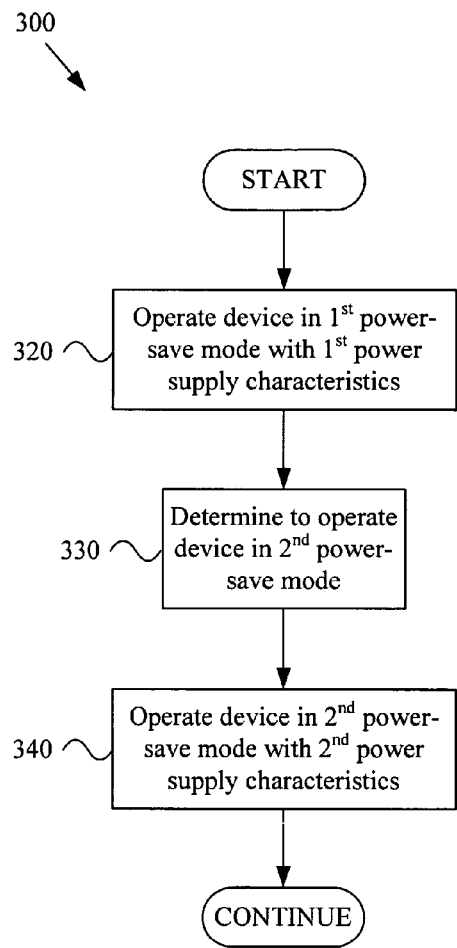
FIG. 3 illustrates an exemplary method for providing multi-tiered power-save operation in a portable communication device, in accordance with various aspects of the present invention.

FIG. 3 illustrates an exemplary method 300 for providing multi-tiered power-save operation in a portable communication device, in accordance with various aspects of the present invention. The exemplary method 300 may, for example and without limitation, share various characteristics with the exemplary methods 100, 200 illustrated in FIGS. 1-2 and discussed previously.

The exemplary method 300 may, at step 320, comprise operating the portable communication device in a first power-save mode characterized by a first set of power supply characteristics. Step 320 may, for example and without limitation, share various characteristics with steps 120 and 220 illustrated in FIGS. 1-2 and discussed previously.

Step 320 may, for example, comprise operating the portable communication device in the first power-save mode by providing electrical power characterized by a first set of power supply characteristics to at least a portion of various electrical components of the portable communication device. Such power supply characteristics may, for example, comprise voltage level characteristics, current level characteristics, voltage and/or current stability characteristics, noise characteristics, tolerance characteristics, ripple characteristics, etc.

In general, step 320 may comprise operating the portable communication device in a first power-save mode characterized by a first set of power supply characteristics. Accordingly, the scope of various aspects of the present invention should not be limited by particular power supply characteristics or a particular manner of providing electrical power having such characteristics to various electrical components of the portable communication device.

The exemplary method 300 may, at step 330, comprise determining to operate the portable communication device in a second power-save mode that is different than the first power-save mode. Step 330 may, for example and without limitation, share various characteristics with steps 130 and 230 illustrated in FIGS. 1-2 and discussed previously.

The exemplary method 300 may, at step 340, comprise operating the portable communication device in the second power-save mode, where such operation is characterized by a second set of power supply characteristics. Step 340 may, for example and without limitation, share various characteristics with steps 140 and 240 illustrated in FIGS. 1-2 and discussed previously.

The second set of power supply characteristics may be different than the first set of power supply characteristics associated with the first power-save mode. In an exemplary scenario, the first power-save mode may be characterized by a first voltage level, and the second power-save mode may be characterized by a second voltage level. In another exemplary scenario, the first power-save mode may be characterized by a first level of voltage variability (e.g., tolerance, ripple, etc.), and the second power-save mode may be characterized by a second level of voltage variability. As mentioned previously the power supply characteristics may comprise any of a variety of known electrical power characteristics.

In general, step 340 may comprise operating the portable communication device in the second power-save mode, where such operation is characterized by a second set of power supply characteristics. Accordingly, the scope of various aspects of the present invention should not be limited by particular power supply characteristics or by any particular manner of providing electrical power having such characteristics to one or more components of the portable communication device.

Figure 4:
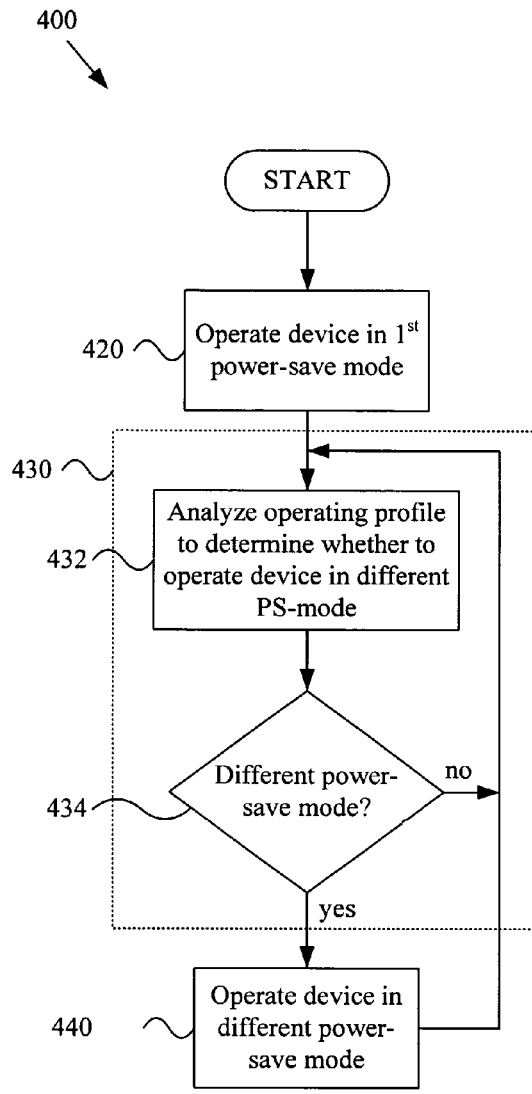
FIG. 4 illustrates an exemplary method for providing multi-tiered power-save operation in a portable communication device, in accordance with various aspects of the present invention.

FIG. 4 illustrates an exemplary method 400 for providing multi-tiered power-save operation in a portable communication device, in accordance with various aspects of the present invention.

The exemplary method 400 may, at step 420, comprise operating the portable communication device in a first power-save mode. Step 420 may, for example and without limitation, share various characteristics with steps 120, 220 and 320 illustrated in FIGS. 1-3 and discussed previously.

The exemplary method 400 may, at step 430, comprise determining to operate the portable communication device in a second power-save mode that is different than the first power-save mode. Step 430 may, for example and without limitation, share various characteristics with steps 130, 230 and 330 illustrated in FIGS. 1-3 and discussed previously.

Step 430 may, for example, comprise determining to operate the portable communication device in a different (e.g., a second) power-save mode based, at least in part, on a predetermined operating profile. Step 430 may, at sub-step 432, comprise analyzing an operating profile to determine whether to operate the portable communication device in a different power-save mode.

As discussed previously, an operating profile may, for example, be time-based, including time-of-day, day-of-week, date, etc. Such a predetermined operating profile may, for example, comprise information of timeframe, events, or other indications that may trigger a change in power-save mode. Such a predetermined operating profile may, for example, comprise a table of timeframe versus default power-save mode. Such a predetermined operating profile may, for example, comprise a table of events or conditions correlated with a particular power-save mode. A predetermined operating profile may, for example, comprise day type information (e.g., workday, weekend, holiday, etc.). In general, the predetermined operating profile may comprise any of a large variety of information correlating various aspects of power-save operation to various events and conditions.

The predetermined operating profile may, for example, comprise information received from a user. For example and without limitation, a user may enter operating profile information through a user interface of the portable communication device, or a user may enter operating profile information on a separate device that may be communicatively coupled, at least temporarily, to the portable communication device.

The predetermined operating profile may, for example, comprise information determined or calculated by a computing device (e.g., a processing module of the portable communication device). Also for example, step 130 may comprise determining operating profile information based on prior monitored usage of the portable communication device.

Step 430 may, at sub-step 434, control execution flow of the method 400. If sub-step 434 determines that the portable communication device is not to be operated in the different power-save mode, then sub-step 434 directs method flow back up to sub-step 432 for continued analysis. If, however, sub-step 434 determines that the portable communication device is to be operated in the different power-save mode, then sub-step 434 directs method flow to step 440.

In general, step 430 may comprise determining to operate the portable communication device in a second power-save mode that is different than the first power-save mode, based at least in part, on a predetermined operating profile. Accordingly, the scope of various aspects of the present invention should not be limited by characteristics of a particular operating profile, manner of determining an operating profile, or manner of analyzing an operating profile.

The exemplary method 400 may, at step 440, comprise operating the portable communication device in the second power-save mode. Step 440 may, for example and without limitation, share various characteristics with steps 140, 240 and 340 illustrated in FIGS. 1-3 and discussed previously.

Figure 5:
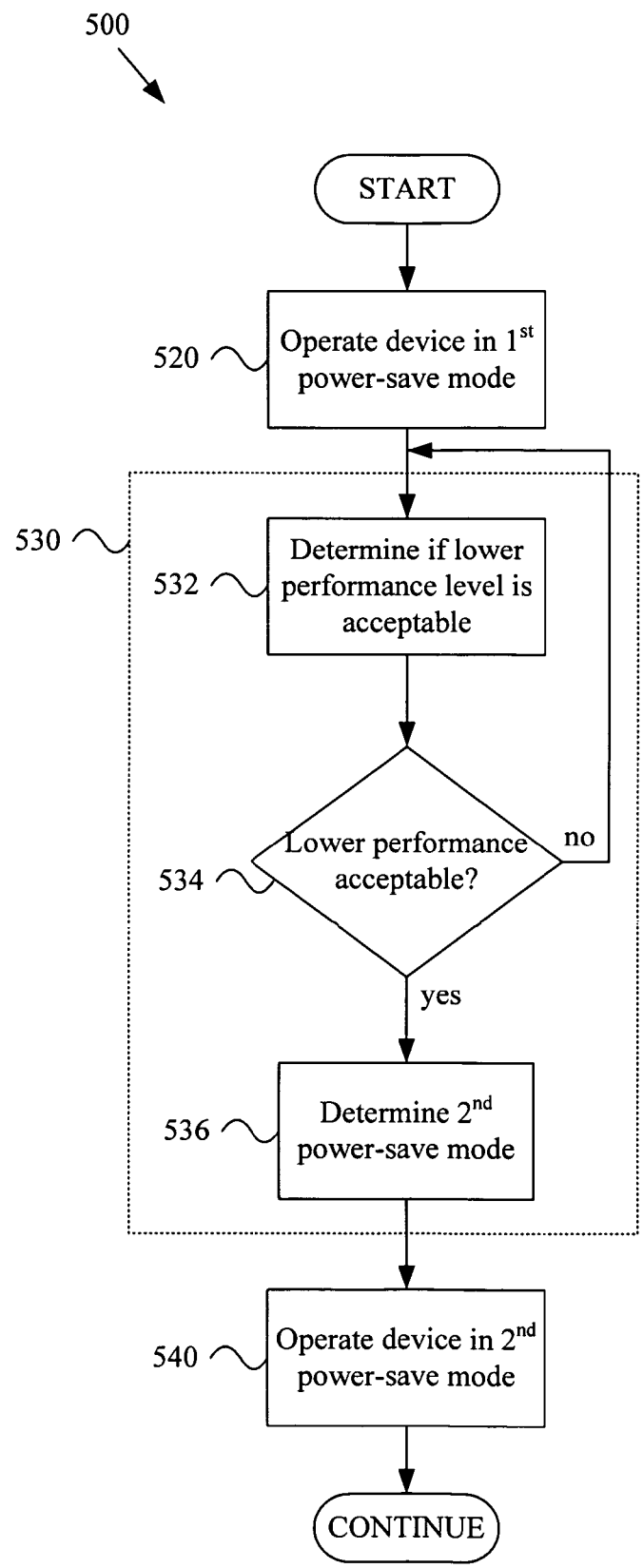
FIG. 5 illustrates an exemplary method for providing multi-tiered power-save operation in a portable communication device, in accordance with various aspects of the present invention.

FIG. 5 illustrates an exemplary method 500 for providing multi-tiered power-save operation in a portable communication device, in accordance with various aspects of the present invention.

The exemplary method 500 may, at step 520, comprise operating the portable communication device in a first power-save mode. Step 520 may, for example and without limitation, share various characteristics with steps 120, 220, 320 and 420 illustrated in FIGS. 1-4 and discussed previously.

The exemplary method 500 may, at step 530, comprise determining to operate the portable communication device in a second power-save mode that is different than the first power-save mode. Step 530 may, for example and without limitation, share various characteristics with steps 130, 230, 330 and 430 illustrated in FIGS. 1-4 and discussed previously.

Step 530 may, for example, comprise determining to operate the portable communication device in a second power-save mode based, at least in part, on performance level (e.g., desired and/or actual performance level). Step 530 may, at sub-step 532, comprise determining if a lower performance level than the current performance level is acceptable.

Sub-step 532 may, for example, comprise determining the current performance level. Such performance level determination may, for example, comprise performance estimation based on various known factors and/or performance monitoring. Performance may, for example, be characterized in any of a variety of manners, such as, for example, reduced processing speed, reduced processing accuracy, reduced clock rate, higher noise level, reduced communication rate, relatively low quality signal encoding or decoding, reduced response time, etc. In particular, but without limitation, performance level may be characterized by metrics indicative of performance perceived by a user of the portable communication device (e.g., sound quality, video quality, data accuracy, noise level, response time, etc.).

Step 532 may, for example, comprise determining current performance needs. Such performance needs may, for example, comprise predetermined needs (e.g., in a predetermined operating profile), needs based on current operating conditions, and/or user-specified performance needs.

Step 530 may, at sub-step 534, comprise controlling execution flow of the exemplary method 500. If sub-step 532 determines that a lower performance level than the current performance level is not acceptable, then sub-step 534 may direct execution flow back up to sub-step 532 for continued determination. If, however, sub-step 532 determines that a lower performance level than the current performance level is acceptable, then sub-step 534 may direct execution flow to step 536.

Step 530 may, at sub-step 536, comprise determining the second power-save mode and/or various characteristics thereof. For example, sub-step 536 may comprise determining the second power-save mode (or various characteristics thereof) from a finite set of power-save modes (e.g., to 1 of N possible modes). Alternatively, for example, sub-step 536 may comprise determining characteristics of the second power-save mode from a relatively infinite set of characteristics. In an exemplary scenario, one or more characteristics of the second power-save mode may be substantially continuously determinable and/or controllable.

Sub-step 536 may, for example, comprise determining various characteristics of the second power-save mode in real-time (e.g., in response to real-time events and conditions). Sub-step 536 may also, for example, comprise determining such characteristics based at least in part on a desired performance level or a minimum acceptable performance level. Sub-step 536 may further, for example, comprise determining such characteristics based at least in part on a desired energy efficiency level or a minimum acceptable energy efficiency level.

In general, step 530 may comprise determining to operate the portable communication device in a second power-save mode that is different than the first power-save mode. Accordingly, the scope of various aspects of the present invention should not be limited by characteristics of a particular power-save mode, performance metric, operating profile, or manner of making such a determination.

The exemplary method 500 may, at step 540, comprise operating the portable communication device in the second power-save mode. Step 540 may, for example and without limitation, share various characteristics with steps 140, 240, 340 and 440 illustrated in FIGS. 1-4 and discussed previously.

Figure 6:
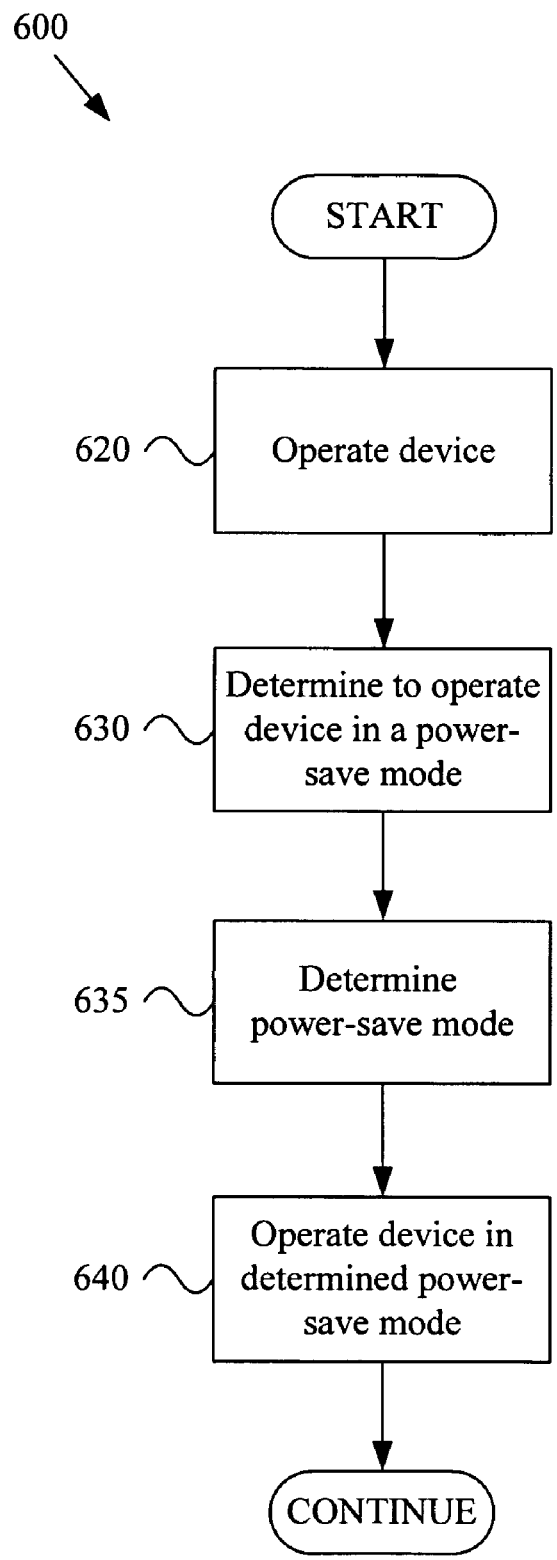
FIG. 6 illustrates an exemplary method for providing multi-tiered power-save operation in a portable communication device, in accordance with various aspects of the present invention.

FIG. 6 illustrates an exemplary method 600 for providing multi-tiered power-save operation in a portable communication device, in accordance with various aspects of the present invention. The exemplary method 600 may, for example and without limitation, share various characteristics with the exemplary methods 100-500 illustrated in FIGS. 1-5 and discussed previously.

The exemplary method 600 may, at step 620, comprise operating the portable communication device. Step 620 may, for example and without limitation, share various characteristics with steps 120, 220, 320, 420 and 520 of the exemplary methods illustrated in FIGS. 1-5 and discussed previously. Additionally, step 620 may, for example, comprise operating the portable communication device in a normal (or typical) operating mode.

The exemplary method 600 may, at step 630, comprise determining to operate the portable communication device in a power-save mode of a plurality of power-save modes. Step 630 may, for example and without limitation, share various characteristics with steps 130, 230, 330, 430 and 530 of the exemplary methods 100-500 illustrated in FIGS. 1-5 and discussed previously.

The exemplary method 600 may, at step 635, comprise determining the power-save mode (e.g., a predefined mode or various characteristics thereof). For example, step 635 may comprise determining the power-save mode (or various characteristics thereof) from a finite set of power-save modes (e.g., to 1 of N possible modes). Alternatively, for example, step 635 may comprise determining characteristics of the power-save mode from a relatively infinite set of power-save mode characteristics. In an exemplary scenario, one or more characteristics of the second power-save mode may be substantially continuously determinable and/or controllable.

Step 635 may, for example, comprise determining various characteristics of the power-save mode in real-time (e.g., in response to real-time events and conditions). Step 635 may also, for example, comprise determining such characteristics based at least in part on a desired performance level or a minimum acceptable performance level. Step 635 may further, for example, comprise determining such characteristics based at least in part on a desired energy efficiency level or a minimum acceptable energy efficiency level.

In general, step 635 may comprise determining the power-save mode (e.g., a predefined mode or various characteristics thereof). Accordingly, the scope of various aspects of the present invention should not be limited by a particular power-save mode, characteristic thereof, or manner of determining a power-save mode or characteristic thereof.

The exemplary method may, at step 640, comprise operating the portable communication device in the power-save mode determined at step 630. Step 640 may, for example and without limitation, share various characteristics with steps 140, 240, 340, 440 and 540 of the exemplary methods 100-500 illustrated in FIGS. 1-5 and discussed previously.

Figure 7:
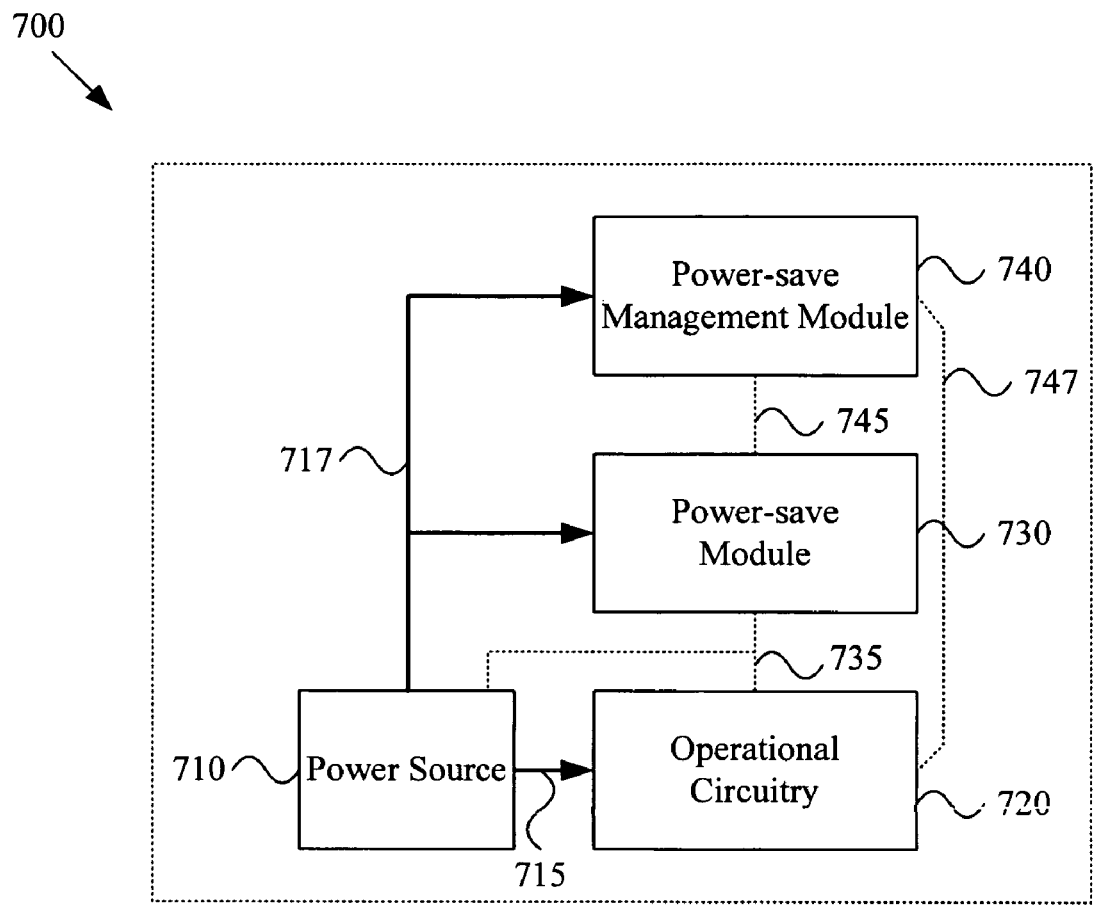
FIG. 7 illustrates an exemplary system for providing multi-tiered power-save operation in a portable communication device, in accordance with various aspects of the present invention.

FIG. 7 illustrates an exemplary system 700 for providing multi-tiered power-save operation in a portable communication device, in accordance with various aspects of the present invention. Various components of the exemplary system 700 may, for example and without limitation, perform the functionality described previously with regard to exemplary methods 100-600 illustrated in FIGS. 1-6 and discussed previously.

The exemplary system 700 may comprise a power source 710. The power source 710 may comprise any of a variety of power source characteristics. For example and without limitation, the power source 710 may comprise a battery and/or power regulation circuitry. The power source 710 may, for example, generally comprise any power source that may provide power to the portable communication device. The power source 710 may, in various exemplary scenarios, comprise various control features. Such control features may, for example, be utilized by various components to control characteristics of electrical power output from the power source 710. In general, the power source 710 may comprise any of a variety of power source characteristics. Accordingly, the scope of various aspects of the present invention should not be limited by characteristics of a particular electrical power source.

The exemplary system 700 may comprise operational circuitry 720 that receives electrical power 715 from the power source 710 and performs any of a variety of functionality in the portable communication device.

The exemplary system 700 may comprise a power-save module 730 that operates the portable communication device (e.g., the operational circuitry 720) in any of a plurality of power-save modes (e.g., a discrete set of power-save modes or a continuous set). The power-save module 730 may, for example and without limitation, perform the functionality of steps 120, 140, 220, 240, 320, 340, 420, 440, 520, 540, 620 and 640 of the exemplary methods 100-600 illustrated in FIGS. 1-6 and discussed previously.

For example, the power-save module 730 may operate the portable communication device (e.g., the operational circuitry 720) in a first power-save mode. Such a first power-save mode may, for example, be characterized by full functionality at a reduced performance level relative to a normal operating mode or may be characterized by reduced functionality. In an exemplary scenario where the power-save module 730 operates the portable communication device in a first power-save mode characterized by full functionality, the power-save module 730 might, for example, operate the portable communication device without placing any electrical devices of the portable communication device in a sleep state. That is, the electrical devices (e.g., the operational circuitry 720) may be operated in a non-sleep state (e.g., responsive to stimuli in real-time) but at a reduced performance level (e.g., lower responsiveness, higher error rate, higher noise rate, slower processing speed, lower operating temperature, etc.).

The power-save module 730 may alternatively, for example, place a portion (e.g., a first amount) of the electrical components of the portable communication device (e.g., the operational circuitry 720) in a sleep state (e.g., for a first time period). Such a sleep state may, for example, comprise a state where the sleeping device(s) is waiting for a signal (e.g., as generated by a sleep timer, another device or a user input) to cause the sleeping device to wake. Such a sleep state may also, for example, comprise a state where the sleeping device(s) is receiving a relatively slow clock signal or a relatively low power level. A device, component or module in a sleep state may generally comprise any of a large variety of known sleep state characteristics.

The first power-save mode may, for example, be characterized by electrical components operating in first respective states. For example and without limitation, the first power-save mode may be characterized by all electrical components in the portable communication device operating normally, albeit with a non-standard power supply or a reduced clock speed. For example, the first power-save mode may be characterized by a first portion of electrical components in a fully operational state and a second portion of electrical components in a sleep state.

The first power-save mode may, for example, comprise a default power-save mode. For example, the portable communication device may operate in the default power-save mode in the absence of a condition or command to cause the portable communication device to enter a different power-save mode.

The first power-save mode may, for example, be characterized by a variety of operating characteristics. For example and without limitation, the first power-save mode may be characterized by a first set of power supply characteristics (e.g., characterizing electrical power 715 provided to the operational circuitry 720 by the power source 710). Such power supply characteristics may, for example, comprise voltage level characteristics, current level characteristics, voltage and/or current stability characteristics, noise characteristics, tolerance characteristics, ripple characteristics, etc. The power-save module 730 may, for example, communicate with the power source 710 over a bus 735 to control characteristics of the electrical power 715 provided by the power source 710. The first power-save mode may also, for example, be characterized by clock characteristics, sleep duration, operating temperature and/or the utilization of select portions of the hardware and/or software of the portable communication device.

The power-save module 730 may also, for example, operate the portable communication device (e.g., the operational circuitry 720) in the second power-save mode. The second power-save mode may, for example, be substantially similar to the first power-save mode or substantially different than the first power-save mode. The second power-save mode may, for example, share various characteristics with the first power-save mode.

The second power-save mode may, for example, be characterized by full functionality at a reduced performance level and higher energy efficiency relative to the first power-save mode. Conversely, the second power-save mode may, for example, be characterized by full functionality at an increased performance level and reduced energy efficiency relative to the first power-save mode.

Further, for example, the second power-save mode may be characterized by operating the portable communication device without placing any electrical components of the portable communication device in a sleep state. Also, for example, the second power-save mode may be characterized by placing a portion of electrical components in a sleep state. The first and second power-save modes may, for example, be characterized by placing all (or substantially all) of the electrical components of the portable communication device in a similar functional state (e.g., operating normally but with different power supply characteristics or a different clock rate).

In an exemplary scenario, the first power-save mode may be characterized by placing a first portion of electrical components in a sleep state (e.g., for a first time period), and the second power-save mode may be characterized by placing a second portion (e.g., which may or may not be different than the first portion) of electrical components in a sleep state (e.g., for a second time period, which may or may not be different than the first time period). In another exemplary scenario, the first power-save mode may be characterized by placing no electrical components in a sleep state, and the second power-save mode may be characterized by placing a portion of electrical components in a sleep state.

The second power-save mode may, for example, be characterized by a set of power supply characteristics (e.g., characterizing electrical power provided by the power source 710). In an exemplary scenario, the first power-save mode may be characterized by a first set of power supply characteristics, and the second power-save mode may be characterized by a second set of power supply characteristics that is different than the first set of power supply characteristics. For example and without limitation, such power supply characteristics may comprise power source 710 output level (e.g., voltage or current), power supply stability, power supply ripple, power supply tolerance, power supply responsiveness, power supply noise level, etc. The second power-save mode may also, for example, be characterized by a different clock speed or operating temperature than the first power-save mode.

In general, the power-save module 730 may operate the portable communication device in any of a plurality of power-save modes. For example, the power-save module 730 may operate the portable communication device (e.g., the operational circuitry 720) in a first power-save mode for a first time period and in a second power-save mode for a second time period, where the second power-save mode has different operational characteristics than the first power-save mode.

Accordingly, the scope of various aspects of the present invention should not be limited by characteristics of particular power-save modes or particular components utilized to operate a portable communication device in a power-save mode.

The exemplary system 700 may comprise a power-save management module 740 that determines a power-save mode in which to operate the portable communication device. For example and without limitation, the power-save management module 740 may perform the functionality of steps 130, 230, 330, 430, 530, 630 and 635 of the exemplary methods 100-600 illustrated in FIGS. 1-6 and discussed previously.

For example and without limitation, the power-save management module 740 may determine whether to operate the portable communication device in a first power-save mode or a second power-save mode (e.g., or any of a number of power-save modes). Also for example, the power-save management module 740 may determine the power-save mode, or characteristics thereof, in which the portable communication device will be operated.

The power-save management module 740 may, for example, determine to operate the portable communication device in a second power-save mode that is different than the first power-save mode. For example and without limitation, the power-save management module 740 may determine to operate the portable communication device in a second power-save mode based at least in part on a pre-determined operating profile. Such a predetermined operating profile may, for example, comprise information of timeframe, events, or other indications that may trigger a change in power-save mode. Such a predetermined operating profile may, for example, comprise a table of timeframe versus default power-save mode. Such a predetermined operating profile may, for example, comprise a table of events or conditions correlated with a particular power-save mode. The predetermined operating profile may, for example, comprise day, day type (e.g., workday, weekend, holiday, etc.), or date information. In general, the predetermined operating profile may comprise any of a large variety of information correlating various aspects of power-save operation to various events and conditions.

The predetermined operating profile may, for example, comprise information received from a user. For example and without limitation, a user may enter operating profile information through a user interface of the portable communication device, or a user may enter operating profile information on a separate device that may be communicatively coupled, at least temporarily, to the portable communication device.

The predetermined operating profile may, for example, comprise information determined or calculated by a computing device (e.g., a processing module of the portable communication device). Also for example, the power-save management module 740 (or other module) may determine operating profile information based on prior monitored usage of the portable communication device.

The power-save management module 740 may, for example, determine to operate the portable communication device (e.g., the operational circuitry 720) in a second power-save mode in response to monitored usage characteristics. Such usage characteristics may, for example, comprise an amount of time passing between the present time and a time of previous device usage. Such usage characteristics may, for example, indicate an end to a need for high performance operation of the portable communication device. Such usage characteristics may, for example, indicate a need for higher performance operation, which may, for example, lead to a determination to operate the portable communication device in a power-save mode that exhibits higher performance characteristics than another power-save mode.

The power-save management module 740 may, for example, determine a level of remaining power (or energy) for the portable communication device (e.g., energy remaining in the power source 710). For example and without limitation, in an exemplary scenario where the portable communication device is running low on power, the power-save management module 740 may determine to operate the portable communication device in a power-save mode that is more energy-efficient than a current power-save mode. Conversely, for example, a determination that a relatively large amount of energy remains for device operation may result in a determination to operate the portable communication device in a power-save mode that exhibits higher performance characteristics than a current power-save mode, but at the expense of lower energy efficiency.

The power-save management module 740 may, for example, determine to operate the portable communication device (e.g., the operational circuitry 720) in a second power-save mode, different than the first power-save mode, based at least in part on current device operating conditions. For example and without limitation, such operating conditions may comprise operating temperature. Such operation conditions may, for example, comprise communication effectiveness parameters, such as noise conditions and error rate. In an exemplary scenario, a first power-save mode may provide acceptable device performance in a low noise environment, but an unacceptable level of device performance in a relatively high noise environment (e.g., because of higher power or higher processing speed needs).

The power-save management module 740 may, for example, determine to operate the portable communication device in a second power-save mode, different than the first power-save mode, based at least in part on a user request. For example, a user may temporarily desire to operate the portable communication device at a different performance level than that at which the portable communication device is currently operating (e.g., at a relatively medium level of performance during a timeframe at which the portable communication device is usually in a deep sleep mode). Also for example, a user may request that the portable communication device operate at a more or less energy efficient level (e.g., operate at a relatively high level of energy efficiency when the portable communication device is usually or currently operating at a relatively low level of energy efficiency). The power-save management module 740 may, for example, respond to a user request by determining to operate the portable communication device in a requested power-save mode (or out of a previously requested power-save mode) for a period of time or until some other specified or default event or condition occurs.

The power-save management module 740 may, for example, determine the second power-save mode (or various characteristics thereof) from a finite set of power-save modes (e.g., to 1 of N possible modes). Alternatively, for example, the power-save management module 740 may determine characteristics of the second power-save mode from a relatively infinite set of characteristics. In an exemplary scenario, one or more characteristics of the second power-save mode may be substantially continuously determinable and/or controllable.

The power-save management module 740 may, for example, determine various characteristics of the second power-save mode in real-time (e.g., in response to real-time events and conditions). The power-save management module 740 may also, for example, determine such characteristics based at least in part on a desired performance level or a minimum acceptable performance level. The power-save management module 740 may further, for example, determine such characteristics based at least in part on a desired energy efficiency level or a minimum acceptable energy efficiency level.

In general, the power-save management module 740, may determine a power-save mode in which to operate the portable communication device. Accordingly, the scope of various aspects of the present invention should not be limited by characteristics of a particular manner of making such a determination. Nor should the scope of various aspects of the present invention be limited by particular power-save mode characteristics or mechanisms for determining such characteristics.

Figure 8:
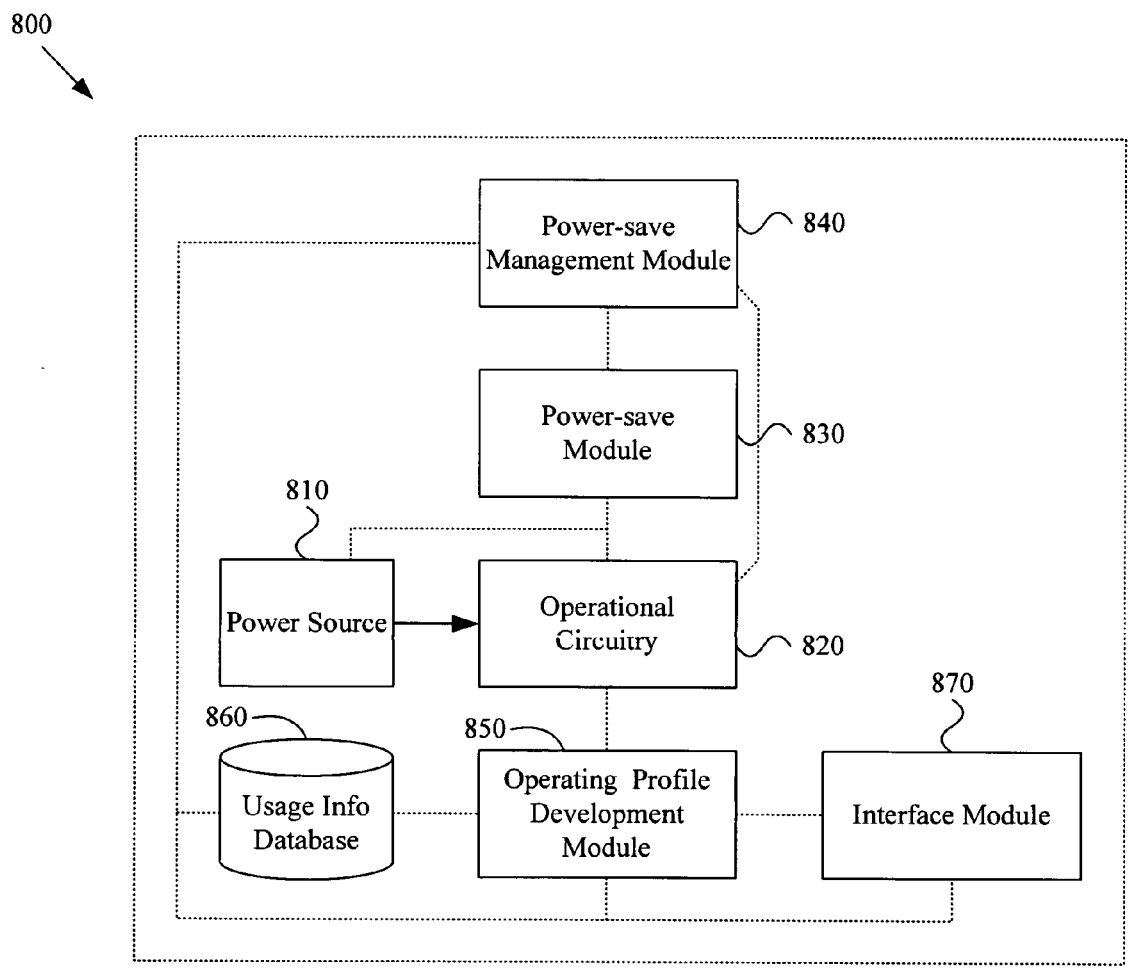
FIG. 8 illustrates an exemplary system for providing multi-tiered power-save operation in a portable communication device, in accordance with various aspects of the present invention.

FIG. 8 illustrates an exemplary system 800 for providing multi-tiered power-save operation in a portable communication device, in accordance with various aspects of the present invention. The exemplary system 800 may, for example and without limitation share various characteristics with the exemplary system 700 illustrated in FIG. 7 and discussed previously. Further for example and without limitation, various components of the exemplary system 800 may, for example and without limitation, perform the functionality described previously with regard to exemplary methods 100-600 illustrated in FIGS. 1-6 and discussed previously. For example, the power source 810, operational circuitry 820, power-save module 830 and power-save management module 840 may, respectively, share various characteristics with the power source 710, operational circuitry 720, power-save module 730 and power-save management module 740 of the exemplary system 700 illustrated in FIG. 7 and discussed previously.

The exemplary system 800 may comprise a usage information database 860. As mentioned previously, various aspects of the present invention may comprise monitoring and/or utilizing information of device usage. Such information may, for example, be stored in the usage information database 860.

The exemplary system 800 may comprise an operating profile development module 850. As mentioned previously, various aspects of the present invention may comprise utilizing an operating profile to make various decisions concerning power-save functionality. Such an operating profile may, for example be developed by the exemplary operating profile development module 850.

For example and without limitation, the operating profile development module 850 may utilize information stored in the usage information database 860 for developing an operating profile. Further for example, the operating profile development module 850 may store information related to an operating profile in the usage information database 860.

The exemplary system 800 may comprise an interface module 870. As mentioned previously, various aspects of the present invention may utilize information received from a user or other entity. For example and without limitation, the operating profile development module 850 may utilize such received information to develop an operating profile. Also for example, the power-save management module 840 may utilize such received information to make power-save decisions. Such received information may, for example, be stored in the usage information database 860. Such received information may also, for example, be provided directly to the operating profile development module 850 and/or the power-save management module 840.

Figure 9:
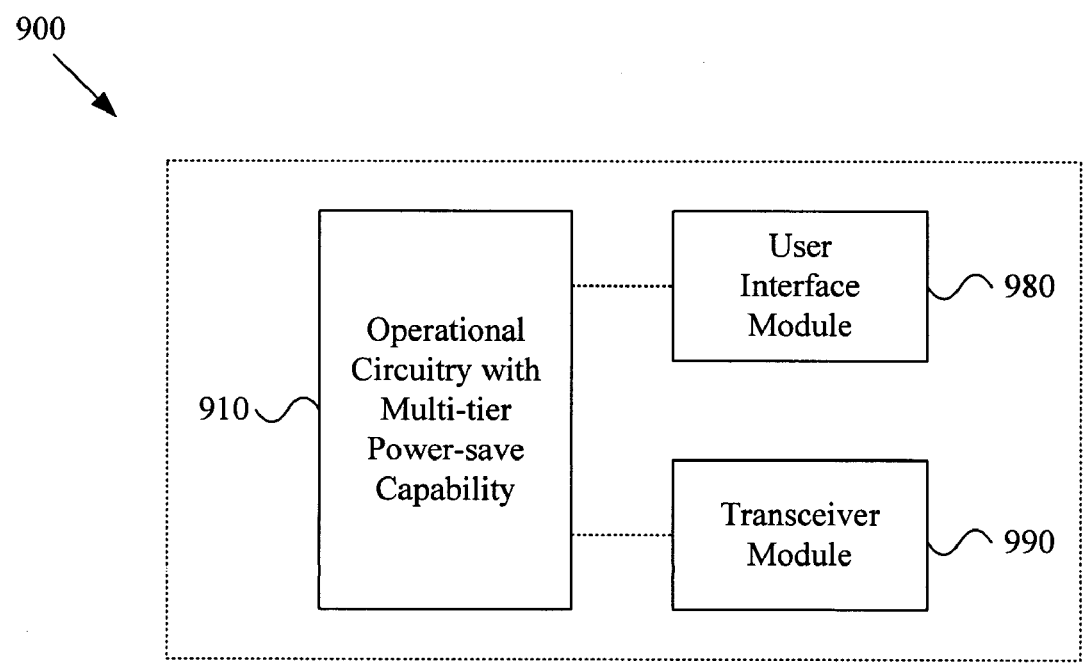
FIG. 9 illustrates an exemplary portable communication device utilizing multi-tiered power-save operation, in accordance with various aspects of the present invention.

FIG. 9 illustrates an exemplary portable communication device 900 utilizing multi-tiered power-save operation, in accordance with various aspects of the present invention. The exemplary device 900 may comprise operational circuitry with multi-tier power-save capability 910. The operational circuitry with multi-tier power-save capability 910 may, for example and without limitation, share various aspects with the exemplary systems 700, 800 illustrated in FIGS. 7-8 and discussed previously. Further for example, the operational circuitry with multi-tier power-save capability 910 may perform various functional aspects of the exemplary methods 100-600 illustrated in FIGS. 1-6 and discussed previously.

The exemplary portable communication device 900 may comprise a user interface module 980. The user interface module 980 may communicate information between a user and the portable communication device 900. The user interface module 980 may comprise any of a variety of user interface devices. For example and without limitation, the user interface module 980 may comprise one or more visual and/or audio interface devices. Further for example, the user interface module 980 may comprise one or more tactile or vibratory user interface devices. Accordingly, the scope of various aspects of the present invention should not be limited by characteristics of a particular user interface device.

The exemplary portable communication device 900 may comprise a transceiver module 990. The transceiver module 990 may generally provide a communication interface between the portable communication device and another communicating entity over a communication medium. For example and without limitation, the transceiver module 990 may comprise a wireless transceiver (e.g., RF or non-tethered optical). The transceiver module 990 may also, for example, comprise a wired or tethered optical interface. Accordingly, the scope of various aspects of the present invention should not be limited by characteristics of a particular transceiver.

It should be noted that the methods illustrated in FIGS. 1-6 and systems illustrated in FIGS. 7-9 and discussed previously are merely exemplary, and accordingly, the scope of various aspects of the present invention should not be limited by characteristics of the exemplary methods and systems.

It should also be noted that various aspects of the present invention might be performed by hardware, a processor executing software instructions, or a combination thereof. Additionally, various system components and/or modules discussed previously may be implemented in various degrees of integration. For example and without limitation, portions of various modules discussed previously may utilize common resources (e.g., hardware and/or software resources). Also, for example, various components and/or modules may be implemented in a distributed system or local system. Various components and/or modules may be implemented on a single integrated circuit or a plurality of integrated circuits. Accordingly, the scope of various aspects of the present invention should not be limited by characteristics of any particular implementation.

In summary, various aspects of the present invention provide a system and method for providing multi-tiered power-save operation in a portable communication device. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for operating a portable communication device, the method comprising:
   operating the portable communication device in a first power-save mode comprising providing telephony service to a user at a first performance level;
   determining to operate the portable communication device in a second power-save mode that is different from the first power-save mode; and
   operating the portable communication device in the second power-save mode comprising providing telephony service to the user at a second performance level different from the first performance level.

2. The method of claim 1, wherein the first power-save mode is characterized by full telephony functionality at a reduced performance level relative to a normal operating mode.

3. The method of claim 1, wherein the first power-save mode is characterized by placing no electrical components of the portable communication device in a sleep state.

4. The method of claim 1, wherein the first power-save mode is characterized by placing no electrical components of the portable communication device in a sleep state, and the second power-save mode is characterized by placing at least a portion of electrical components of the portable communication device in a sleep state.

5. The method of claim 1, wherein the first power-save mode is characterized by placing at least a portion of electrical components of the portable communication device in a sleep state for a first predetermined time period specified by a user in an operating profile, and the second power-save mode is characterized by placing at least a portion of electrical components of the portable communication device in a sleep state for a second predetermined time period specified by a user in an operating profile, where the second predetermined time period is different from the first predetermined time period.

6. The method of claim 1, wherein determining to operate the portable communication device in a second power-save mode comprises determining to operate the portable communication device in the second power-save mode instead of another power-save mode based at least in part on a predetermined operating profile specified by a user, the predetermined operating profile comprising a table of respective events or conditions associated with the first and second power-save modes.

7. The method of claim 1, wherein determining to operate the portable communication device in a second power-save mode comprises determining to operate the portable communication device in the second power-save mode instead of another power-save mode based at least in part on monitored usage of the portable communication device.

8. The method of claim 1, wherein determining to operate the portable communication device in a second power-save mode comprises determining to operate the portable communication device in the second power-save mode instead of another power-save mode based at least in part on a determined amount of electrical power available to the portable communication device.

9. The method of claim 1, wherein determining to operate the portable communication device in a second power-save mode comprises determining to operate the portable communication device in the second power-save mode instead of another power-save mode based, at least in part, on time-of-day information.

10. The method of claim 1, wherein determining to operate the portable communication device in a second power-save mode comprises determining to operate the portable communication device in the second power-save mode instead of another power-save mode based at least in part on a comparison between current performance level of the portable communication device and current performance needs.

11. The method of claim 1, wherein determining to operate the portable communication device in a second power-save mode comprises determining to operate the portable communication device in the second power-save mode instead of another power-save mode based at least in part on a user request.

12. The method of claim 1, wherein the first power-save mode comprises providing a first power supply voltage characterized by first voltage characteristics, and the second power-save mode comprises providing a second power supply voltage characterized by second voltage characteristics different from the first voltage characteristics.

13. The method of claim 1, further comprising determining operating characteristics of the second power-save mode based at least in part on monitored performance level of the portable communication device.

14. The method of claim 1, further comprising determining operating characteristics of the second power-save mode in real-time.

15. A system for operating a portable communication device, the system comprising at least one module that operates to, at least:
   operate the portable communication device in a first power-save mode comprising providing telephony service to a user at a first performance level;
   determine whether to operate the portable communication device in a second power-save mode that is different from the first power-save mode; and
   if the at least one module determines to operate the portable communication device in the second power-save mode, then operate the portable communication device in the second power-save mode comprising providing telephony service to the user at a second performance level different from the first performance level.

16. The system of claim 15, wherein:
   the first module comprises a power-save module; and
   the second module comprises a power-save management module.

17. The system of claim 15, wherein the first power-save mode is characterized by full telephony functionality at a reduced performance level relative to a normal operating mode.

18. The system of claim 15, wherein, in the first power-save mode, the at least one module operates to place no electrical components of the portable communication device in a sleep state.

19. The system of claim 15, wherein:
   in the first power-save mode, the at least one module operates to place no electrical components of the portable communication device in a sleep state; and
   in the second power-save mode, the at least one module operates to place at least a portion of electrical components of the portable communication device in a sleep state.

20. The system of claim 15, wherein:
   in the first power-save mode, the at least one module operates to place at least a portion of electrical components of the portable communication device in a sleep state for a first predetermined time period specified by a user in an operating profile; and
   in the second power-save mode, the at least one module operates to place at least a portion of the electrical components of the portable communication device in a sleep state for a second predetermined time period specified by a user in an operating profile, where the second predetermined time period is different from the first predetermined time period.

21. The system of claim 15, wherein the at least one module operates to determine whether to operate the portable communication device in the second power-save mode instead of another power-save mode according to a pre-determined operating profile specified by a user, the predetermined operating profile comprising a table of respective events or conditions associated with the first and second power-save modes.

22. The system of claim 15, wherein the at least one module operates to determine whether to operate the portable communication device in the second power-save mode instead of another power-save mode based at least in part on monitored usage of the portable communication device.

23. The system of claim 15, wherein the at least one module operates to determine whether to operate the portable communication device in the second power-save mode instead of another power-save mode based at least in part on a determined amount of electrical power available to the portable communication device.

24. The system of claim 15, wherein the at least one module operates to determine to operate the portable communication device in the second power-save mode instead of another power-save mode based, at least in part, on time-of-day information.

25. The system of claim 15, wherein the at least one module operates to determine whether to operate the portable communication device in the second power-save mode instead of another power-save mode based at least in part on a comparison between current performance level of the portable communication device and current performance needs.

26. The system of claim 15, wherein the at least one module operates to determine whether to operate the portable communication device in a second power-save mode instead of another power-save mode based at least in part on a user request.

27. The system of claim 15, wherein the first power-save mode comprises providing a first power supply voltage characterized by first voltage characteristics, and the second power-save mode comprises providing a second power supply voltage characterized by second voltage characteristics different from the first voltage characteristics.

28. The system of claim 15, wherein the at least one module operates to determine operating characteristics of the second power-save mode based at least in part on monitored performance level of the portable communication device.

29. The system of claim 15, wherein the at least one module operates to determine operating characteristics of the second power-save mode in real-time.

30. A method for operating a portable communication device, the method comprising:
operating the portable communication device in a first mode;
determining to operate the portable communication device in a selected power-save mode of a plurality of power-save modes, each of the plurality of power-save modes comprising providing telephony service to a user at a different respective performance level; and
operating the portable communication device in the selected power-save mode comprising providing telephony service to the user at a respective performance level.

31. The method of claim 30, wherein the first mode is a power-save mode of the plurality of power-save modes, and the first mode is associated with providing telephony service to the user at a respective performance level that is different from the respective performance level associated with the selected power-save mode.

32. A system for operating a portable communication device, the system comprising at least one module that operates to, at least:
determine to operate the portable communication device in a selected power-save mode of a plurality of power-save modes, each of the plurality of power-save modes comprising providing telephony service to a user at a different respective performance level; and
operate the portable communication device in the selected power-save mode comprising providing telephony service to the user at a respective performance level.

33. The method of claim 1, wherein determining to operate the portable communication device in a second power-save mode comprises determining to operate the portable communication device in the second power-save mode based, at least in part, on day-of-week information.

34. The method of claim 1, wherein determining to operate the portable communication device in a second power-save mode comprises determining to operate the portable communication device in the second power-save mode based, at least in part, on type-of-day information.

35. The method of claim 1, wherein determining to operate the portable communication device in a second power-save mode comprises determining to operate the portable communication device in the second power-save mode based, at least in part, on date information.

36. The method of claim 10, wherein the current performance needs are user-specified.

37. The method of claim 1, wherein determining to operate the portable communication device in a second power-save mode comprises determining to operate the portable communication device in the second power-save mode instead of another power-save mode based, at least in part, on determined current communication effectiveness.

38. The method of claim 1, wherein determining to operate the portable communication device in a second power-save mode comprises determining to operate the portable communication device in the second power-save mode instead of another power-save mode based, at least in part, on current signal noise level.

39. The method of claim 1, wherein determining to operate the portable communication device in a second power-save mode comprises determining to operate the portable communication device in the second power-save mode while operating the portable communication device in the first power-save mode.

40. The method of claim 12, wherein the first voltage characteristics comprise a first voltage level, and the second voltage characteristics comprise a second voltage level different from the first voltage level.

41. The method of claim 12, wherein the first voltage characteristics comprise a first voltage variability level, and the second voltage characteristics comprise a second voltage variability level different from the first voltage variability level.

42. The method of claim 1, wherein the telephony service comprises cellular telephony service.

43. The method of claim 1, wherein:
providing telephony service to a user at a first performance level comprises providing telephony service to the user at a first level of user-perceived communication quality; and
providing telephony service to the user at a second performance level comprises providing telephony service to the user at a second level of user-perceived communication quality different from the first level of user-perceived communication quality.

44. The method of claim 1, wherein:
providing telephony service to a user at a first performance level comprises providing telephony service to the user at a first level of sound quality; and
providing telephony service to the user at a second performance level comprises providing telephony service to the user at a second level of sound quality different from the first level of sound quality.

* * * * *